3,694,396
METHOD FOR PRODUCING A POLYURETHANE SOLUTION

Yasuji Nakahara, Kiyoshi Ichikawa, and Kunio Kondo, Fujishi, Japan, assignors to Asahi Kasei Kogyo Kabushiki Kaisha, Osaka, Japan
No Drawing. Filed Dec. 29, 1970, Ser. No. 102,502
Int. Cl. C08g 22/04
U.S. Cl. 260—30.8 DS
13 Claims

ABSTRACT OF THE DISCLOSURE

A polyurethane solution suitable for producing polyurethane elastic yarns, films, elastmers, foams or the like having superior, light-fastness and laundry fastness is produced by adding a solution of a prepolymer into a solution of an organic diamine and a pyridine-carboxylic acid hydrazide derivative to cause the reaction between the foregoing reactants. Said prepolymer contains remaining NCO radical and is obtained by reacting (1) a polymer having bifunctional group, terminal active hydrogen at both the ends and a molecular weight of 500–5,000 and (2) an organic diisocyanate.

DESCRIPTION OF THE INVENTION

This invention relates to a method for producing a polyurethane solution suitable for producing polyurethane elastic yarns, films, elastomers, foams or the like having superior light-fastness even after repeated washing.

It has been well-known that polyurethane elastic yarns are produced by subjecting to a wet spinning or a dry spinning process, a solution of a high molecular weight polymer obtained by effecting a chain-extending reaction of a prepolymer with a diamine in the presence of an organic monoamine, said prepolymer being obtained by reacting a substantially linear low molecular weight polymer having terminal hydrogen atoms at both the ends and an excessive amount of an organic diisocyanate. However, it has been observed that the polyurethane elastic yarns produced by such a method, discolor, lose their mechanical strength and elongation and reduce their commercial value exceedingly within a short time when exposed to sunlight.

In order to overcome these drawbacks of conventional methods, there are proposed the use of an aliphatic diisocyanate such as hexamethylenediisocyanate or a cycloaliphatic diisocyanate such as 4,4'-alkylidenedicyclohexyl diisocyanate (as in Japanese Patent Publication No. 26673/1969) as a constitutional unit of polyurethane by which elastic yarns relatively stable to sunlight can be obtained. However, these polyurethane elastic yarns having such constitutional unit had defect in the points that their modulus is low or recovery from elongation particularly instantaneous recovery from elongation is inferior. Accordingly, an aromatc polyisocyanate, particularly 4,4'-diphenylmethane diisocyanate, has been used for most of the purposes, and thus in many references of prior arts there have been proposed various kinds of stabilizers to be added to prevent polyurethane elastic yarns which are produced by using an aromatic diisocyanate from being deteriorated by light. For example, there is a description in Japanese patent publication No. 25828/1968 that the addition of a compound having a free hydrazide radical is effective to the prevention of discoloration and oxidation.

However, the effectiveness for the prevention of deterioration by light is not satisfactory even when any of such stabilizers is used. Moreover, due to their poor wash-fastness, stabilizers fall off the yarns by repetition of washing and eventually the effectiveness for the prevention of deterioration by light is almost lost.

It is an object of the present invention to provide a method for producing a polyurethane solution which gives shaped articles such as elastic yarns, films, elastomers, foams or the like having light-fastness even after repeated washing.

Such an object can be attained by the method of the present invention.

The present invention is directed to a method for producing a polyurethane solution suitable for producing polyurethane elastic yarns, films, elastomers, foams or the like which comprises reacting a prepolymer obtained by reacting a bifunctional polymer having a molecular weight of 500–5,000 and active hydrogen atoms at both the ends with an organic diisocyanate compound, and containing residual NCO radical, with an organic diamine compound and a hydrazide derivative of pyridine-carboxylic acid, in an organic polar solvent, at a temperature in the range of $-10°$ C. to $120°$ C.

It is also a characteristic feature of the method of the present invention that a solution of a high molecular weight polymer obtained by the method of the present invention is superior in the stability of viscosity and a higher concentrated solution is easily obtained when compared with a high molecular weight polymer obtained by any of the conventional methods.

A hydrazide derivative of pyridinecarboxylic acid herein referred to, is a hydrazide of monopyridinecarboxylic acid, or a hydrazide of substituted pyridinemonocarboxylic acid having no active hydrogen in the substituent. Preferable examples of hydrazide derivative of pyridinecarboxylic acid are hydrazides of picolinic acid, nicotinic acid, isonicotinic acid, quinaldic acid, 4-methyl-2-pyridinecarboxylic acid, 2-methyl-4-pyridinecarboxylic acid, etc.

These hydrazides can be used alone or as a mixture of two or more members.

Low molecular weight polymers having active terminal hydrogen atoms at both the ends used in the method of the present invention include polyethers such as polyethyleneetherglycol, polypropyleneetherglycol, polytetramethyleneetherglycol, polypentamethyleneetherglycol etc., polyesters which are condensation products of dibasic acid such as adipic acid, succinic acid, sebacic acid, etc. and lower molecular weight glycol such as ethyleneglycol, propyleneglycol, butyleneglycol, etc., polylactones produced by the ring-opening polymerization of lactones such as ε-caprolactone, δ-valerolactone, etc.

Examples of suitable organic diisocyanates, which are reacted with said low molecular weight polymers to form said prepolymers, include aromatic diisocyanates such as 2,4-tolylene diisocyanate, 2,6-tolylene diisocyanates, p-phenylene diisocyanate, 4,4'-diphenylmethane diisocyanate, 3,3'-dimethyl-4,4'-diphenylmethane diisocyanate, 4,4'-diphenylene diisocyanate, 1,5-naphthylene diisocyanate; aliphatic diisocyanates such as trimethylene diisocyanate tetramethylene diisocyanate, adipyl diisocyanate, hexamethylene diisocyanate; aliphatic diisocyanates containing the aromatic ring such as p-xylene diisocyanate, m-xylylene diisocyanate; cyclo-aliphatic diisocyanates such as methylene-bis-4,4'-cyclohexylisocyanate, isopropylidene-bis-4,4'-cyclohexylisocyanate, cyclohexane 1,4-diisocyanate. Mixture of two or more of said diisocyanates may also be used.

In conducting the chain-extending reaction of prepolymer in the method of the present invention, the molar ratio of an organic diamine to a hydrazide derivative of pyridinecarboxylic acid has influence upon the viscosity of resultant polyurethane solution. For a spinning solution, the molar ratio in the range of 99:1–90:10 is preferable. If the proportidn of hydrazide is greater than the abovementioned range, a lower viscosity solution is obtained which can be used as adhesives, and if it is smaller, a higher viscosity solution is obtained which can be used for producing films or foams. However, when superior light fastness is to be expected, it is preferable that the molar ratio of an organic diamine to a hydrazide derivative of pyridinecarboxylic acid be 99:1 or less.

It is preferable that the total active hydrogen radical of the chain-extending agent and the NCO radical of the prepolymer are of approximately the same molar quantity.

In order to prevent the quantity of the NCO radical remaining in the reaction system from becoming excessive to the active hydrogen radical in the chain-extending agent in the chain-extending reaction, a solution of prepolymer is added to a solution of said chain-extending agent or reaction is carried out continuously while always maintaining an equimolar relation of NCO radical and active hydrogen radical in the method of the present invention. It is to be noted that if a solution of a chain-extending agent is added to a solution of a prepolymer, only a solution of a high molecular weight polymer which is difficult to conduct spinning due to its extremely poor spinnability is obtained; hence the effectiveness of the present invention cannot be achieved.

Chain-extending agents used in the method of the present invention include conventionally known organic primary and secondary amines, but such a lower aliphatic diamine as ethylenediamine, propylenediamine, or the like is effective.

When hydrazine or a well-known dihydrazide is used in place of an organic diamine in the method of the present invention, the solubility of resultant polymer is low, and hence it is difficult to obtain a highly concentrated solution of a high molecular weight polymer. In addition, only a solution having an unstable viscosity is obtained. Moreover, the elastic yarns prepared by using hydrazine as a chain-extending agent show notable extent of discoloration and deterioration by a chlorine-type bleaching agent compared with those prepared by using an organic diamine, and hence they are not suitable material.

In order to prevent the gelation which may occur during the time of chain-extending reaction of prepolymer, it has been heretofore known that the addition of a monoamine such as diethylamine or the like is effective. However, the viscosity of resultant solution of a high molecular weight polymer has no reproducibility, and the production of elastic yarns having a fixed denier and modulus is difficult. In addition, fabrics prepared from the elastic yarns of this kind have often resulted in uneven streaks.

Whereas by using a hydrazide derivative of pyridinecarboxylic acid in conducting the chain-extending reaction in the method of the present invention, and also by heating the reactants at 65° C.–100° C. for at least 2 hours generally for 2 to 20 (the heating for more than 20 hours does not increase the viscosity stability more than that obtained at 20 hours) during the later period of the chain-extending reaction (at the time when the addition of a prepolymer solution has completed), it is possible to obtain a solution of a high molecular weight polymer having an extremely good reproducibility, a stable viscosity and an excellent spinnability. However, if the heating temperature is lower than 65° C. or higher than 100° C., or if the heating time is less than 2 hours, the stability of viscosity and the reproducibility are lost and not suitable as a spinning solution. The reason for this fact is not known.

As for organic polar solvents useful in the method of the present invention, conventionally known solvents such as dimethylformamide, dimethylacetamide, dimethylsulfoxide and the like are illustrated, but so long as it is capable of dissolving resultant high molecular weight polymers, uniformly, any kind of solvent can be used.

The elastic yarns of the present invention can include any of conventionally known antioxidants, ultraviolet absorbers, pigments, extenders.

The following examples are given to illustrate the present invention without limiting its scope. All parts in examples are by weight.

EXAMPLE 1

100.0 parts of polyethylene adipate having a mean molecular weight of 1200 and 31.2 parts of 4,4'-diphenylmethanediisocyanate were reacted together at 95° C., for 90 minutes, in the stream of nitrogen gas and with stirring to give an intermediate polymer (prepolymer) having isocyanate groups at both the ends thereof. The resultant polymer was then cooled to room temperature and dissolved in 236.2 parts of dried dimethylformamide. The content of NCO in the solution thus obtained was 0.218 mmol/g.

On the other hand, 2.28 parts of ethylenediamine and 0.55 part of picolinic acid hydrazide were dissolved in 157.4 parts of dimethylformamide. To the resultant solution was added the above-mentioned prepolymer solution at room temperature. On starting the addition, the reaction proceeded rapidly to give a high viscosity solution of high molecular weight polymer. Immediately after completion of the addition, the solution was heated to 80° C., and stirring was continued for 8 hours. The viscosity of the resultant solution of high molecular weight polymer measured at 30° C. was 180 poises. Further, the viscosity measured after the solution was allowed to stand for one week was 185 poises, namely there was almost no change in viscosity.

The solution was subjected to degassing at room temperature under a reduced pressure of 3 mm. Hg until no bubble was observed, and then extruded through nozzles of 0.09 mm. $\phi$, at a spinning velocity of 560 m./min. into an air stream having a length of 4 m. and heated to 230° C. Thus, elastic yarns having a fineness of 44 deniers, a tenacity of 0.91 g./d., an elongation of 510% and a permanent set of 3.2% were obtained. A light fastness test of the elastic yarns and also the same test after washing treatment were carried out. The results are shown in Table 1. The light fastness tests are expressed by tenacity-retaining percentage and coloring extent after the yarns were irradiated for 30 hours by a fadeometer. As for the washing conditions, the elastic yarns were shaked for 15 minutes in water containing 0.5% Marseilles soap at 40° C., then washed sufficiently and dried in air. The yarns having undergone the repeated foregoing procedures ten times, were used as a sample for washing treatment.

EXAMPLE 2

100.0 parts of polytetramethylene glycol having a mean molecular weight of 1250 and 32.0 parts of 4,4'-diphenylmethanediisocyanate were reacted together at 85° C., for 120 minutes, in the stream of nitrogen gas and with stirring to give an intermediate polymer having isocyanate groups at both the ends thereof. The resultant polymer was then cooled to room temperature and dissolved in 150 parts of dried dimethylacetamide with stirring at room temperature to give a uniform solution. On the other hand, 2.54 parts of ethylenediamine and 0.74 part of isonicotinic acid hydrazide were dissolved in 100 parts of dimethylformamide. On adding the above-mentioned intermediate polymer solution to the resultant solution of ethylene diamine and the hydrazide, reaction occurred rapidly to give a high viscosity solution having a viscosity of 420 poises. The viscosity measured after the resultant solution was heated at 85° C., for 5 hours, was 182 poises. Further, the viscosity measured after the solution was allowed to stand at room temperature for one week, was 185 poises.

The solution was subjected to spinning in the same manner as in Example 1 to give elastic yarns having a fineness of 45 deniers, a tenacity of 0.97 g./d., an elongation of 495% and a permanent set of 3.6%.

EXAMPLE 3

A solution of high molecular weight polymer obtained by substituting quinaldic acid hydrazide for isonicotinic acid hydrazide in Example 2, has a viscosity of 175 poises. (The viscosity after one week was 180 poises.) The elastic yarns obtained by spinning the solution had a fineness of 42 deniers, a tenacity of 0.89 g./d., an elongation of 520% and a permanent set of 3.0%.

EXAMPLE 4

A solution of high molecular weight polymer obtained by substituting 4-methyl-2-pyridinecarboxylic acid hydrazide for picolinic acid hydrazide, in Example 1, had a viscosity of 170 poises. (The viscosity after one week was 170 poises.) Further, the elastic yarns obtained by spinning the solution had a fineness of 43 deniers, a tenacity of 0.86 g./d., an elongation of 530% and a permanent set of 3.8%.

Control 1

A solution of high molecular weight polymer obtained by substituting well-known diethylamine for picolinic acid hydrazide in Example 1, had a viscosity of 305 poises, but when the solution was allowed to stand at room temperature, the resultant solution had a viscosity of 520 poises in 5 hours. Thus, the solution was deficient in the stability of viscosity. Further, the yarns obtained by spinning the solution had a fineness of 46 deniers, a tenacity of 0.68 g./d., an elongation of 490% and a permanent set of 5.2% as mean values in the measurements ten times, although the yarns gave considerable deviations from mean values in the measurements of the above-mentioned physical properties. The results of the light-fastness test and the same test after washing treatment, are shown in Table 1.

Controls 2 and 3

In Control 1, just before degassing, namely at a stage when the polymerization reaction had completed, a well-known stabilizer, 4,4'-butylidenebis (6-t-butyl-3-methylphenol) (Control 2) or picolinic acid hydrazide (Control 3) was merely added, and the solution was then subjected to spinning to produce elastic yarns. It was observed that even when picolinic acid hydrazide was used in free state, particularly as in case of Control 3, since light-fastness is remarkably reduced by washing, the effectivenss of the present invention could not be shown as seen in Table 1.

TABLE—1

| | Untreated elastic yarns | | Washing treatment elastic yarns | |
|---|---|---|---|---|
| | Tenacity retaining percentage, percent | Coloring extent | Tenacity retaining percentage, percent | Coloring extent |
| Example: | | | | |
| 1 | 101.8 | None | 100.0 | None. |
| 2 | 98.2 | do | 97.8 | Do. |
| 3 | 100.2 | do | 99.8 | Do. |
| 4 | 97.6 | do | 96.4 | Do. |
| Control: | | | | |
| 1 | 31.1 | Yellow | 28.4 | Yellow. |
| 2 | 62.1 | Light yellow | 36.4 | Do. |
| 3 | 87.3 | do | 41.6 | Do. |

Control 4

A solution of high molecular weight polymer obtained by substituting hydrazine hydrate for ethylenediamine in Example 1, had no reproducibility and was inferior in spinnability. This solution was very difficult in spinning, but as a result of strenuous efforts, elastic yarns having a fineness of 50 deniers, a tenacity of 0.54 g./d., an elongation of 410% and a permanent set of 18.2%, were obtained. As shown by such figures, the yarns were remarkably inferior in recovery property. Further, the elastic yarns obtained in Example 1 had a tenacity-retaining percentage of 80.4% when treated with an aqueous solution of 0.8% by weight of sodium chlorite adjusted to a pH of 3.5, whereas the elastic yarns obtained in Control 4 had a tenacity-retaining percentage of 18.1% when treated as above-mentioned.

EXAMPLE 5

100.0 parts of poly-$\epsilon$-caprolactonediol having a mean molecular weight of 1150 and 35.1 parts of 4,4'-diphenylmethanediisocyanate were reacted to obtain a prepolymer as in Example 1. The content of NCO in the solution obtained by adding 100 parts of dimethylacetamide to to the prepolymer was 0.272 mmol/g. This solution of prepolymer was added to a solution of a chain-extending agent (obtained by dissolving 2.69 parts of propylenediamine and 0.46 part of picolinic acid hydrazide in 100 parts of dimethyl acetamide) at room temperature with stirring. On starting the addition, the reaction proceeds rapidly to give a high viscosity solution of a high molecular weight polymer.

In order to investigate the stability of viscosity of a solution of this high molecular weight polymer, it was left to stand at a room temperature, after heating at a temperature of 80° C. for 15 minutes, 30 minutes, one hour, one hour and a half, two hours, four hours and eight hours and the changes of viscosity with elapse of times were measured. As sown in Table 2, it is necessary to heat more than 2 hours in order to use a solution of a high molecular weight polymer as a spinning solution for producing elastic yarns having a stable viscosity.

TABLE 2.—CHANGES OF VISCOSITY WITH ELAPSE OF TIME (80° C.)

| | Standing time after heating (room temp.) | | | |
|---|---|---|---|---|
| Heating hours (80° C.) | 0 hr. | 5 hr. | 1 day | 1 week |
| 0 | 2,500 | 7,000 | >10,000 | >10,000 |
| 1.0 | 1,700 | 2,000 | 8,500 | >10,000 |
| 2.0 | 1,430 | 1,450 | 1,500 | 1,600 |
| 8.0 | 1,390 | 1,410 | 1,390 | 1,400 |

EXAMPLE 6

The procedure similar to that disclosed in Example 1 was carried out, except that 33.5 parts of methylene-bis-4,4'-cyclohexylisocyanate was employed instead of 31.2 parts of 4,4'-diphenylmethanediisocyanate. The viscosity of the resultant solution of high molecular weight polymer measured at 30° C. was 175 poises. Further, the viscosity measured after the solution was allowed to stand for one week was 178 poises. The elastic yarns from the solution described above spun in the same manner as in Example 1 had 98.2% of tenacity-retaining percentage and no coloring extent and after washing treatment still had 89.8% of tenacity-retaining percentage.

EXAMPLE 7

The procedure similar to that disclosed in Example 2 was carried out, except that 21.5 parts of hexamethylenediisocyanate was employed instead of 32.0 parts of 4,4'-diphenylmethanediisocyanate. The viscosity of the resultant solution of high molecular weight polymer measured at 30° C. was 148 poises. Further, the viscosity measured after the solution was allowed to stand for one week was 150 poises.

The elastic yarns from the solution above spun in the same manner as in Example 1 had 97.8% tenacity-retaining percentage and after washing treatment 97.5% of that, and didn't discolor under sun-light.

What is claimed is:

1. A method for producing a polyurethane solution which comprises reacting a prepolymer having terminal isocyanate radicals, obtained by reacting a bifunctional polymer having a molecular weight of 500–5,000 and active hydrogen atoms at both the ends, with an organic diisocyanate compound, with an organic diamine compound and a monopyridinecarboxylic acid monohydrazide in a medium of an organic polar solvent at a temperature in the range of −10° C. to 120° C., the ratio of said organic diamine to said monohydrazide is in the range of 99:1–90:10.

2. A method according to claim 1 wherein a solution of said prepolymer is added to a solution of said mixture.

3. A method according to claim 1 wherein the reaction mixture is heated at a temperature of 65° C. to 100° C. at least for two hours.

4. A method according to claim 2 wherein the reaction mixture is heated at a temperature of 65° C. to 100° C. at least for two hours.

5. A method according to claim 1, wherein said bifunctional polymer having a molecular weight of 500–5,000 and active hydrogen atoms at both the ends is selected from the group consisting of polyether, polyester and polylactone.

6. A method according to claim 5 wherein said polyether is selected from the group consisting of polyethylene - etherglycol, polypropylene - etherglycol, polytetramethylene - etherglycol and polypentamethyleneethergly- col.

7. A method according to claim 5 wherein said polyester is a condensation product whose acid component is selected from the group consisting of adipic acid, succinic acid, and sebacic acid and whose diol component is selected from the group consisting of ethylene glycol, propylene glycol and butylene glycol.

8. A method according to claim 5 wherein said polylactone is selected from the group consisting of poly-$\epsilon$-caprolactone and poly-$\delta$-valerolactone.

9. A method according to claim 1, wherein said organic diisocyanate compound is 4,4'-diphenylmethanediisocyanate.

10. A method according to claim 1, wherein said organic diamine compound is selected from the group consisting of ethylenediamine and propylenediamine.

11. A method according to claim 1, wherein said hydrazide is selected from the group consisting of picolinic acid hydrazide, nicotinic acid hydrazide, isonicotinic acid hydrazide, quinaldic acid hydrazide, 4-methyl-2-pyridinecarboxylic acid hydrazide and 2-methyl-4-pyridinecarboxylic acid hydrazide.

12. A method according to claim 1, wherein said organic polar solvent is selected from the group consisting of dimethylformamide, dimethylacetamide and dimethylsulfoxide.

13. A method according to claim 1, wherein the total active hydrogen radical in said organic diamine compound and said hydrazide and the NCO radical of said prepolymer are of approximately the same molar quantity.

References Cited

UNITED STATES PATENTS

| | | | |
|---|---|---|---|
| 2,929,800 | 3/1960 | Hill | 260—32.6 N |
| 3,149,998 | 9/1964 | Thurmaier | 260—75 NH |
| 3,202,636 | 8/1965 | Windemuth | 260—75 NH |
| 3,485,778 | 12/1969 | Oertel | 260—77.5 AM |

MORRIS LIEBMAN, Primary Examiner

P. R. MICHL, Assistant Examiner

U.S. Cl. X.R.

260—32.6 N, 75 NH, 77.5 AM, 77.5 AN, 77.5 SP